(12) United States Patent
Furusawa et al.

(10) Patent No.: US 11,767,882 B2
(45) Date of Patent: Sep. 26, 2023

(54) MOTION GUIDE APPARATUS

(71) Applicant: THK CO., LTD., Tokyo (JP)

(72) Inventors: Ryuji Furusawa, Tokyo (JP); Hiroyuki Kishi, Tokyo (JP); Toshikazu Ban, Tokyo (JP); Mihoko Miura, Tokyo (JP)

(73) Assignee: THK CO., LTD., Tokyo (JP)

( * ) Notice: Subject to any disclaimer, the term of this patent is extended or adjusted under 35 U.S.C. 154(b) by 126 days.

(21) Appl. No.: 17/601,652

(22) PCT Filed: Mar. 13, 2020

(86) PCT No.: PCT/JP2020/011051
§ 371 (c)(1),
(2) Date: Oct. 5, 2021

(87) PCT Pub. No.: WO2020/209001
PCT Pub. Date: Oct. 15, 2020

(65) Prior Publication Data
US 2022/0196068 A1 Jun. 23, 2022

(30) Foreign Application Priority Data

Apr. 8, 2019 (JP) ................................ 2019-073276

(51) Int. Cl.
*F16C 29/06* (2006.01)
(52) U.S. Cl.
CPC .......... *F16C 29/06* (2013.01); *F16C 29/0609* (2013.01)
(58) Field of Classification Search
CPC .. F16C 29/06; F16C 29/0609; F16C 29/0611; F16C 29/065
See application file for complete search history.

(56) References Cited

U.S. PATENT DOCUMENTS 7,798,718 B2 * 9/2010 Matsumoto ......... F16C 33/3825
384/54
9,458,883 B2 * 10/2016 Kadono .............. F16C 29/0671
(Continued)

FOREIGN PATENT DOCUMENTS

| CN | 103228937 A | 7/2013 |
| CN | 103867569 A | 6/2014 |

(Continued)

OTHER PUBLICATIONS

Translation of CN 103867569 obtained Apr. 5, 2023.*
(Continued)

*Primary Examiner* — James Pilkington
(74) *Attorney, Agent, or Firm* — WHDA, LLP

(57) ABSTRACT

A motion guide apparatus which prevents a retainer from falling-off. A motion guide apparatus includes a track member having a rolling element rolling portion; a movable member having a loaded rolling element rolling portion facing the rolling element rolling portion of the track member; a return path; and a turn-around path connected to a loaded path and the return path; a plurality of rolling elements placed in the loaded path, the return path, and the turn-around path; and a retainer configured to hold at least one of the plurality of rolling elements. Grooves into which an end of the retainer in a width direction thereof enters are formed in the loaded path, the return path, and the turn-around path. A width of the grooves in at least a part of the turn-around path and/or in the return path is greater than a width of the groove in the loaded path.

6 Claims, 10 Drawing Sheets

(56) References Cited

U.S. PATENT DOCUMENTS

2008/0085067 A1* 4/2008 Hsu .................... F16C 29/0633
                                                       384/45
2012/0073396 A1    3/2012 Kawaguchi et al.
2013/0236133 A1    9/2013 Takahashi
2015/0337899 A1   11/2015 Kadono et al.

FOREIGN PATENT DOCUMENTS

| JP | 2009-127740 A | 6/2009 |
| JP | 2012-220014 A | 11/2012 |
| JP | 2014-137125 A | 7/2014 |
| TW | 201104092 A | 2/2011 |

OTHER PUBLICATIONS

Office Action dated Nov. 30, 2022, issued in counterpart CN Application No. 202080027190.X, with English Translation. (9 pages).
Office Action dated Dec. 28, 2022, issued in counterpart TW Application No. 109109942. (7 pages).
International Search Report dated Apr. 21, 2020, issued in counterpart International Application No. PCT/JP2020/011051. (2 pages).

* cited by examiner

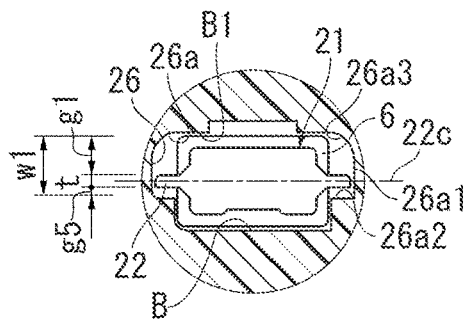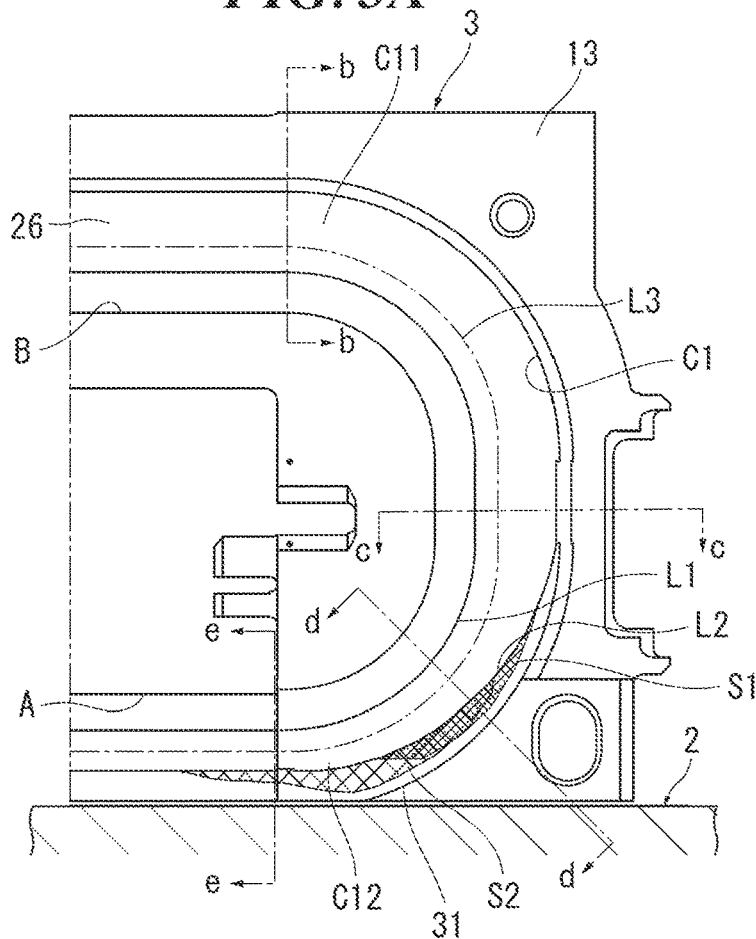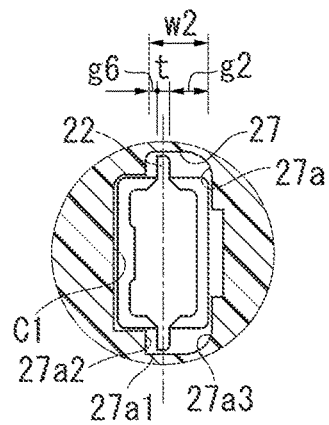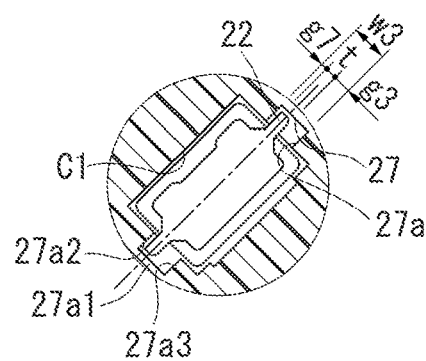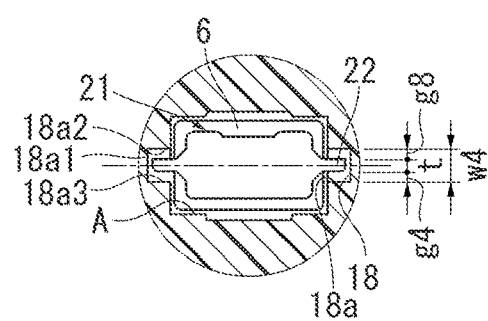

MOTION GUIDE APPARATUS

TECHNICAL FIELD

The present invention relates to a motion guide apparatus that guides linear motion or curvilinear motion of a movable body.

BACKGROUND ART

A motion guide apparatus guides the motion (linear motion or curvilinear motion) of a movable body such as a table by use of rolling motion of a rolling element such as a ball or roller. The motion guide apparatus includes a track member and a movable member that can move along the track member. A plurality of the rolling elements such as balls or rollers is disposed between the track member and the movable member. The movable body is guided by use of the rolling motion of the rolling elements, which enables guiding the movable body with high accuracy and high rigidity.

A rolling element rolling portion is formed on the track member. A loaded rolling element rolling portion facing the rolling element rolling portion of the track member, a return path parallel to a loaded path formed by the rolling element rolling portion and the loaded rolling element rolling portion, and turn-around paths are formed on and in the movable member. The loaded path, the return path, and the turn-around paths configure a track-shaped endless circulation path. The plurality of the rolling elements is placed in the loaded path, the return path, and the turn-around paths. The movable member moves relative to the track member to circulate the rolling elements in the endless circulation path.

At least one of the plurality of the rolling elements is held by a retainer. A groove into which an end of the retainer in a width direction thereof enters is formed in the loaded path, the return path, and the turn-around paths. The groove is provided to guide the circulation of the retainer. Moreover, the groove is provided to prevent the retainer from falling off the movable member when the movable member is removed from the track member.

CITATION LIST

Patent Literature

Patent Literature 1: JP 2012-220014 A

SUMMARY OF INVENTION

Technical Problem

However, the width of the groove into which the end of the retainer in the width direction enters is formed to be constant in the loaded path, the return path, and the turn-around paths in the known motion guide apparatus. Hence, when the retainer moves in the return path, the turn-around path, and the loaded path, and when the retainer moves in the loaded path, the turn-around path, and the return path in the reverse direction, resistance during the circulation of the retainer may fluctuate if the retainer touches, particularly, a wall surface of the groove of the turn-around path.

Hence, an object of the present invention is to provide a motion guide apparatus that can prevent a retainer from falling off when a movable member is removed from a track member and reduce fluctuations of resistance during the circulation of the retainer.

Solution to Problem

In order to solve the above problem, an aspect of the present invention is a motion guide apparatus including: a track member having a rolling element rolling portion; a movable member having a loaded rolling element rolling portion facing the rolling element rolling portion of the track member, a return path parallel to a loaded path formed by the rolling element rolling portion and the loaded rolling element rolling portion, and a turn-around path connected to the loaded path and the return path; a plurality of rolling elements placed in the loaded path, the return path, and the turn-around path; and a retainer configured to hold at least one of the plurality of rolling elements, in which a groove into which an end of the retainer in a width direction thereof enters is formed in the loaded path, the return path, and the turn-around path, and the width of the groove in at least a part of the turn-around path and/or the width of the groove in at least a part of the return path are greater than the width of the groove in at least a part of the loaded path.

Advantageous Effects of Invention

According to the present invention, the groove into which the end of the retainer in the width direction enters is provided in the loaded path. Accordingly, it is possible to prevent the retainer from falling off when the movable member is removed from the track member. Moreover, contact between the retainer and a wall surface of the groove can be reduced in at least a part of the turn-around path and/or in at least a part of the return path. Accordingly, fluctuations of resistance during circulation of the retainer can be reduced.

BRIEF DESCRIPTION OF DRAWINGS

FIGS. 5A to 5E are detailed views of the endless circulation path of the embodiment (FIG. 5A is a cross-sectional view taken along the endless circulation path, and FIGS. 5B to 5E are cross-sectional views taken along line b-b to line e-e in FIG. 5A, respectively).

DESCRIPTION OF EMBODIMENTS

A motion guide apparatus of an embodiment of the present invention is described hereinafter on the basis of the accompanying drawings. However, the motion guide apparatus of the present invention can be embodied in various modes, and is not limited to the embodiment described in the description. The embodiment is provided with the intention of enabling those skilled in the art to fully understand the scope of the invention by fully disclosing the description.

Figure 1:
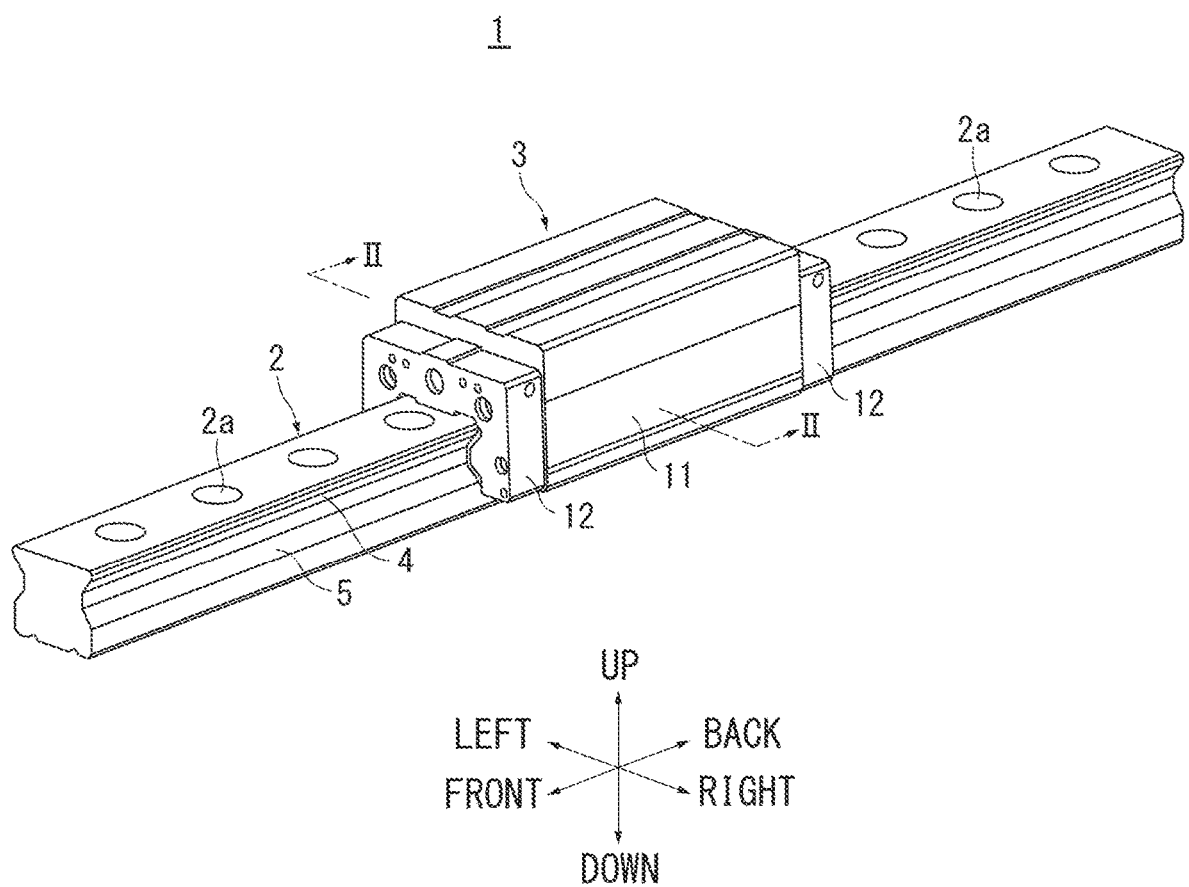
FIG. 1 is an external perspective view of a motion guide apparatus of an embodiment of the present invention.
Figure 2:
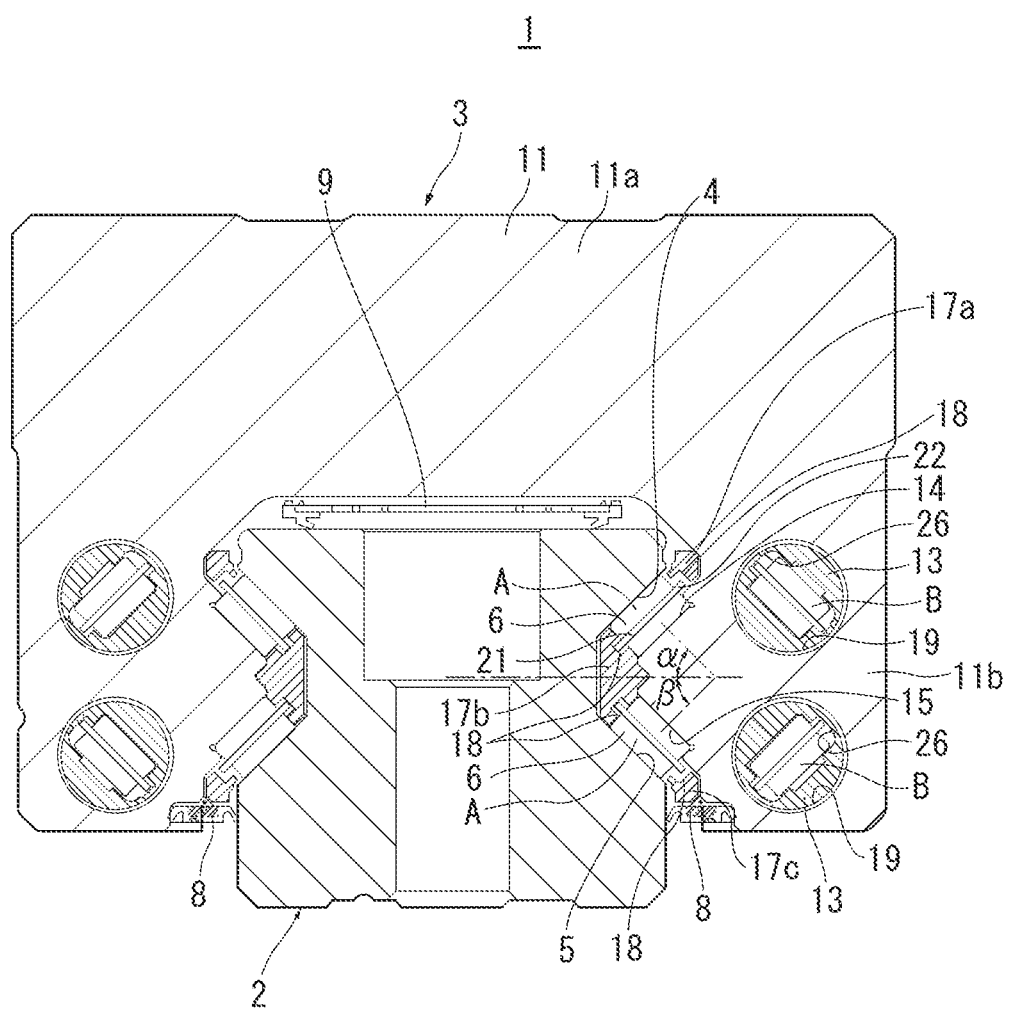
FIG. 2 is a cross-sectional view taken along line II-II in FIG. 1.
Figure 3A:
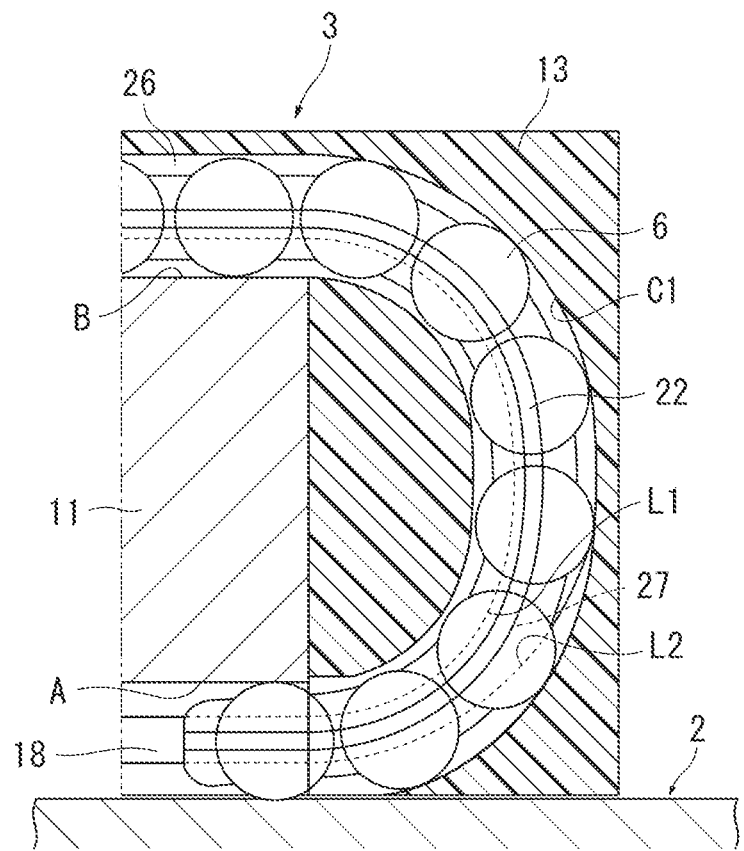
FIGS. 3A and 3B are cross-sectional views taken along an endless circulation path of the embodiment (FIG. 3A is a state where a retainer and rollers are incorporated, and FIG. 3B is a state where the retainer and the rollers have been removed).
Figure 3B:
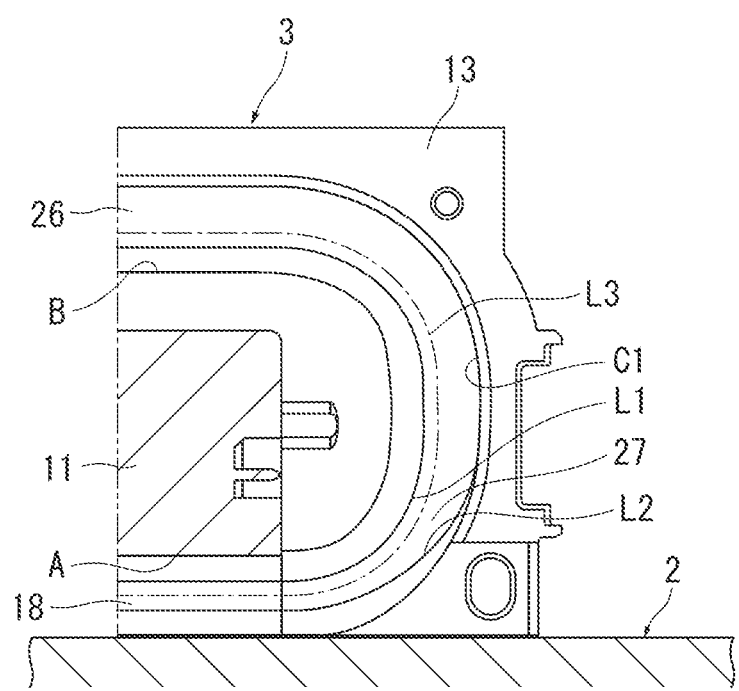

FIG. 1 illustrates an external perspective view of a motion guide apparatus of an embodiment of the present invention. FIG. 2 illustrates a cross-sectional view taken along line II-II in FIG. 1. FIGS. 3A and 3B illustrate cross-sectional views taken along an endless circulation path. For convenience of explanation, directions of when a motion guide apparatus 1 is placed on a horizontal plane and viewed from the front, that is, up and down, left and right, and front and back in FIG. 1 are used below to describe the configuration of the motion guide apparatus 1. Naturally, the placement of the motion guide apparatus 1 is not limited to the above.

As illustrated in FIG. 1, the motion guide apparatus 1 includes a rail 2 as a track member, and a movable member 3. The rail 2 extends in a straight line in the front-and-back direction in which the movable member 3 moves. The movable member 3 can move along a straight line in a length direction of the rail 2. The rail 2 is attached to, for example, an unillustrated base. A bolt through-hole 2a for attaching the rail 2 to the base is formed in an upper surface of the rail 2.

As illustrated in FIG. 2, the movable member 3 has an inverted U shape in cross section, and is assembled to the rail 2 in such a manner as to straddle the rail 2. The movable member 3 is attached to an unillustrated movable body such as a table. An unillustrated screw hole for attachment of the movable body is formed in an upper surface of the movable member 3.

The movable member 3 moves relative to the rail 2, or the rail 2 may move. Moreover, the rail 2 may be curved in such a manner that the movable member 3 moves in a curved path.

As illustrated in FIG. 1, roller rolling surfaces 4 and 5 as rolling element rolling portions are formed on the rail 2. The roller rolling surfaces 4 and 5 extend in the length direction of the rail 2. Rollers as rolling elements roll on the roller rolling surfaces 4 and 5. In the embodiment, the roller rolling surfaces 4 and 5 are formed in two rows on each of left and right surfaces of the rail 2.

As illustrated in FIG. 2, a contact angle α of a roller 6 that rolls on the upper roller rolling surface 4 is set at, for example, 45° relative to a horizontal direction. A contact angle β of the roller 6 that rolls on the lower roller rolling surface 5 is set at, for example, 45° relative to the horizontal direction. The number of rows of and the placement of the roller rolling surfaces 4 and 5, and the contact angles α and β of the rollers 6 are examples, and are set as appropriate, according to radial load, reverse radial load, and lateral load acting on the motion guide apparatus 1. A reference sign 8 denotes a side seal, and a reference sign 9 denotes an upper seal.

As illustrated in FIG. 1, the movable member 3 includes a metal movable member body 11, a pair of lid members 12 that are attached to both end surfaces of the movable member body 11 in a moving direction thereof, and circulation components 13 that are incorporated into the movable member body 11 and the lid members 12 (refer to FIGS. 7A and 7B, and the details are described below).

As illustrated in FIG. 2, loaded roller rolling surfaces 14 and 15 facing the roller rolling surfaces 4 and 5 of the rail 2 are formed on the movable member body 11. The movable member body 11 has an inverted U shape in cross section, and includes a center portion 11a facing the upper surface of the rail 2, and a pair of left and right sleeve portions 11b. The loaded roller rolling surfaces 14 and 15 are formed in two rows on each of the pair of left and right sleeve portions 11b. Loaded roller rolling paths A as loaded paths are formed between the roller rolling surfaces 4 and 5 of the rail 2 and the loaded roller rolling surfaces 14 and 15 of the movable member body 11. In the loaded roller rolling paths A, the rollers 6 roll between the roller rolling surfaces 4 and 5 and the loaded roller rolling surfaces 14 and 15 while bearing load.

Holding portions 17a, 17b, and 17c that hold a retainer 21 are provided to an inner surface of the sleeve portion 11b of the movable member body 11. The holding portions 17a, 17b, and 17c include an upper holding portion 17a, a middle holding portion 17b, and a lower holding portion 17c. The holding portions 17a, 17b, and 17c are made of resin, and are formed integrally with the movable member body 11, or incorporated into the movable member body 11.

Grooves 18 into which an end of the retainer 21 in a width direction thereof enters are formed in the holding portions 17a, 17b, and 17c. The groove 18 is formed in each of the upper holding portion 17a, the middle holding portion 17b, and the lower holding portion 17c. The groove 18 prevents the retainer 21 from falling off the movable member 3 when the movable member 3 is removed from the rail 2. The roller 6 is held by the retainer 21. The retainer 21 is held; accordingly, it is also possible to prevent the roller 6 from falling off the movable member 3. The holding portions 17a, 17b, and 17c may be formed in such a manner as to hug the roller 6 to prevent the roller 6 from falling off.

A return path B is formed parallel to the loaded roller rolling path A in the movable member body 11. The return paths B correspond one by one to the loaded roller rolling paths A. A through-hole 19 is formed parallel to the loaded roller rolling path A in the movable member body 11. The return path B is formed in the circulation component 13 that is inserted into the through-hole 19. The return path B is formed to be slightly larger than the roller 6. The roller 6 moves in the return path B while being pushed by the subsequent roller 6 and pulled by the retainer 21.

A groove 26 into which an end 22 of the retainer 21 in the width direction thereof enters is formed in the return path B. The roller 6 in the return path B does not fall off the movable member 3 even if the movable member 3 is removed from the rail 2. The groove 26 of the return path B is provided to avoid interference with the end 22 of the retainer 21.

The lower loaded roller rolling path A and the upper return path B are connected to a turn-around path C1 (refer to FIGS. 3A and 3B). The turn-around path C1 is formed in the circulation component 13. The upper loaded roller rolling path A and the lower return path B are connected to a turn-around path C2 (refer to FIG. 9). The turn-around path C2 is formed between the lid member 12 and the circulation component 13. The turn-around path C1 and the turn-around path C2 pass over/under the other (the details are described below).

FIGS. 3A and 3B illustrate cross-sectional views taken along an endless circulation path. FIG. 3A illustrates a state where the retainer 21 and the rollers 6 are incorporated. FIG. 3B illustrates a state where the retainer 21 and the rollers 6 have been removed. As illustrated in FIG. 3A, the loaded roller rolling path A and the return path B are straight and parallel to each other. The turn-around path C1 connected to one end of the loaded roller rolling path A and one end of the return path B has a U shape. The turn-around path C1 is also connected to the unillustrated other ends of the loaded roller rolling path A and the return path B. The loaded roller rolling path A, the return path B, and a pair of the turn-around paths C1 configure the track-shaped endless circulation path.

As illustrated in FIGS. 3A and 3B, a groove 27 into which the end of the retainer 21 in the width direction thereof enters is formed in the turn-around path C1. In FIG. 3A, an inner-side wall surface of the groove 27 is indicated by a broken line L1, and an outer-side wall surface of the groove 27 is indicated by a broken line L2. Similarly, in FIG. 3B, the inner-side wall surface of the groove 27 is indicated by a solid line L1, and the outer-side wall surface of the groove 27 is indicated by a solid line L2. A dot-and-dash line L3 in FIG. 3B is a center line of the end 22 (hereinafter referred to as the band 22) of the retainer 21 in the width direction.

Figure 4:
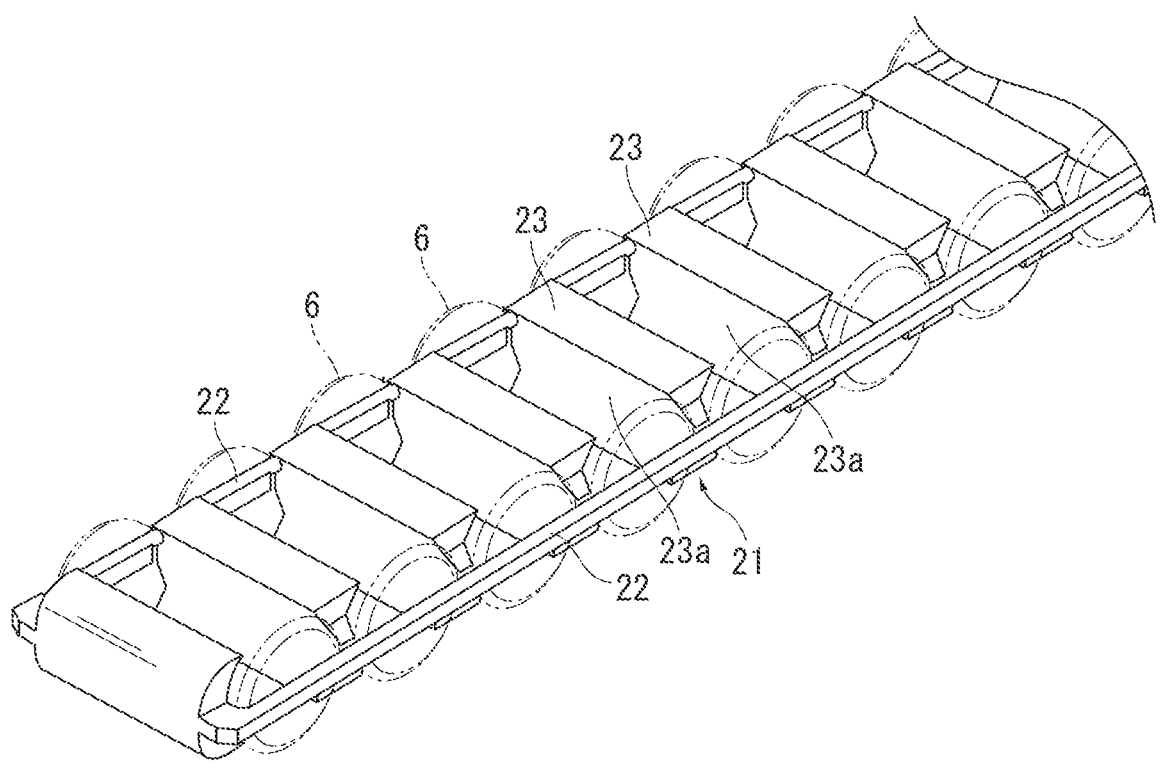
FIG. 4 is a perspective view of the retainer of the embodiment.

FIG. 4 illustrates a perspective view of the retainer 21. The retainer 21 includes a plurality of spacers 23 disposed between the rollers 6, and a pair of the bands 22 connecting the plurality of spacers 23. The spacer 23 is provided to prevent contact between the rollers 6. A curved recessed portion 23a that fits the shape of an outer peripheral surface of the roller 6 is formed on the spacer 23. The spacers 23 are connected by the pair of the bands 22. The pair of the bands 22 is placed on both end surfaces of the roller 6. The band 22 configures the end of the retainer 21 in the width direction.

FIGS. 5A to 5E illustrate detailed views of the endless circulation path. As illustrated in FIG. 5B, the groove 26 into which the band 22 of the retainer 21 enters is formed in the return path B. The groove 26 includes a bottom portion 26a1 facing an end surface of the band 22 in a width direction thereof, an inner-side wall portion 26a2 facing an inner side surface of the band 22, and an outer-side wall portion 26a3 facing an outer side surface of the band 22. The bottom portion 26a1 is perpendicular to the wall portions 26a2 and 26a3. An intersection of the outer-side wall portion 26a3 and the bottom portion 26a1 is formed into an arc shape to secure the thickness of a return path configuration portion 32 (refer to FIGS. 7A and 7B). As illustrated in FIGS. 5C and 5D, the groove 27 into which the band 22 of the retainer 21 enters is formed in the turn-around path C1. The groove 27 includes a bottom portion 27a1, an inner-side wall portion 27a2, and an outer-side wall portion 27a3 as in the groove 26. As illustrated in FIG. 5E, the groove 18 into which the band 22 of the retainer 21 enters is formed in the loaded roller rolling path A. The groove 18 includes a bottom portion 18a1, an inner-side wall portion 18a2, and an outer-side wall portion 18a3 as in the groove 27. The bottom portion 18a1 is perpendicular to the wall portions 18a2 and 18a3.

A width W1 (refer to FIG. 5B) of the groove 26 in the return path B is greater than a width W4 (refer to FIG. 5E) of the groove 18 in the loaded roller rolling path A. Clearance g1 (refer to FIG. 5B) from the band 22 to the outer-side wall surface 26a (26a3) of the groove 26 facing the band 22 in the return path B is also greater than clearance g4 (refer to FIG. 5E) from the band 22 to the outer-side wall surface 18a of the groove 18 facing the band 22 in the loaded roller rolling path A.

As illustrated in FIG. 5B, the clearance g1 in the return path B is greater than clearance g5 from the band 22 to the inner-side wall surface 26a2 of the groove 26 facing the band 22 in the return path B. t denotes the thickness of the band 22. A center line 22c of the band 22 is substantially aligned with the center line of the roller 6, but may be misaligned in the up-and-down direction in FIG. 5B. The outer-side wall surface 26a of the groove 26 in the return path B and a wall surface B1 of the return path B facing the perimeter of the roller 6 are at the same distance from the center line 22c of the band 22. The width W1 of the groove 26 in the return path B is substantially constant along the entire length of the return path B. The width W4 of the groove 18 in the loaded roller rolling path A is also substantially constant along the entire length of the loaded roller rolling path A.

The cross-sectional shape of an end C11 on the return path B side of the turn-around path C1 is substantially the same as the cross-sectional shape of the return path B illustrated in FIG. 5B. The groove 27 in the end C11 on the return path B side of the turn-around path C1 is continuously connected to the groove 26 in the return path B. In other words, the joint of the grooves 27 and 26 substantially has no height difference.

The cross-sectional shape of an end C12 on the loaded roller rolling path A side of the turn-around path C1 is substantially the same as the cross-sectional shape of the loaded roller rolling path A illustrated in FIG. 5E. The groove 27 in the end C12 on the loaded roller rolling path A side of the turn-around path C1 is continuously connected to the groove 18 in the loaded roller rolling path A. In other words, the joint of the grooves 27 and 18 substantially has no height difference.

The width W1 (refer to FIG. 5B) of the groove 27 in the end C11 on the return path B side of the turn-around path C1 is greater than the width W4 (refer to FIG. 5E) of the groove 27 in the end C12 on the loaded roller rolling path A side of the turn-around path C1. More specifically, the width W1 and a width W2 of the groove 27 of the turn-around path C1 are substantially the same in half of the turn-around path C1 on the return path B side (an area from line b-b to line c-c) as illustrated in FIG. 5C. In other words, clearance g2 from the band 22 to the outer-side wall surface 27a (27a3) of the groove 27 facing the band 22 in a cross section of the turn-around path C1 along line c-c is substantially the same as the clearance g1 (refer to FIG. 5B). Similarly, clearance g6 (refer to FIG. 5C) from the band 22 to the inner-side wall surface 27a2 of the groove 27 facing the band 22 is substantially the same as the clearance g5 (refer to FIG. 5B).

As illustrated in FIGS. 5C and 5D, the width W2 and a width W3 of the groove 27 of the turn-around path C1 are gradually reduced toward the loaded roller rolling path A in half of the turn-around path C1 on the loaded roller rolling path A side (an area from line c-c to line e-e). As illustrated in FIGS. 5D and 5E, clearance from the band 22 to the outer-side wall surface 27a of the groove 27 facing the band 22 in the turn-around path C1 is also gradually reduced toward the loaded roller rolling path A. In other words, as illustrated in FIG. 5D, clearance g3 from the band 22 to the outer-side wall surface 27a (27a3) of the groove 27 facing the band 22 in a cross section of the turn-around path C1 along line d-d is also less than the clearance g2 (refer to FIG. 5C), and is greater than the clearance g4 (refer to FIG. 5E).

On the other hand, clearance g7 from the band 22 to the inner-side wall surface 27a2 of the groove 27 facing the band 22 is substantially the same as the clearance g6 (refer to FIG. 5C).

As illustrated in FIG. 5E, the width W4 of the groove 18 in the loaded roller rolling path A is less than the width W3 (refer to FIG. 5D) of the groove 27 in the turn-around path C1. The clearance g4 from the band 22 to the outer-side wall surface 18a (18a3) of the groove 18 facing the band 22 in the loaded roller rolling path A is less than the clearance g3 (refer to FIG. 5D). On the other hand, clearance g8 from the band 22 to the inner-side wall surface 18a2 of the groove 18 facing the band 22 is substantially the same as the clearance g7 (refer to FIG. 5D).

Up to this point the configuration of the motion guide apparatus 1 of the embodiment has been described. The motion guide apparatus 1 of the embodiment exerts the following effects: As illustrated in FIGS. 2 and 5E, the groove 18 into which the band 22 of the retainer 21 enters is provided in the loaded roller rolling path A. Accordingly, it is possible to prevent the retainer 21 from falling off when the movable member 3 is removed from the rail 2.

As illustrated in FIG. 3A, when the retainer 21 enters the U-shaped turn-around path C1 from the straight return path B, the retainer 21 becomes curved following the curve of the line of the rollers 6. However, a distal end of the band 22 of the retainer 21 tends to remain straight. Hence, when the retainer 21 enters the turn-around path C1 from the return path B, the distal end of the band 22 of the retainer 21 may contact the turn-around path C1. Conversely, when the retainer 21 enters the return path B from the turn-around path C1, the distal end of the band 22 of the retainer 21 may contact an end of the return path B.

However, according to the motion guide apparatus 1 of the embodiment, as illustrated in FIGS. 5A to 5E, the widths W1 and W2 of the grooves 26 and 27 in the return path B and in the end C11 on the return path B side of the turn-around path C1 are greater than the width W4 of the groove 18 in the loaded roller rolling path A, and the outer-side wall surfaces 26a and 27a of the grooves 26 and 27 in the return path B and in the end C11 on the return path B side of the turn-around path C1 are away from the band 22 of the retainer 21. Hence, it is possible to prevent the band 22 of the retainer 21 from contacting the wall surfaces 26a and 27a of the grooves 26 and 27.

Moreover, the width W4 (refer to FIG. 5E) of the groove 27 in the end C12 on the loaded roller rolling path A side of the turn-around path C1 is less than the width W1 (refer to FIG. 5B) of the groove 27 in the end C11 on the return path B side of the turn-around path C1. Hence, it is possible to impart the function of scooping the retainer 21 to the groove 27 in the end C12 on the loaded roller rolling path A side of the turn-around path C1. The groove 27 is caused to have the function of scooping the retainer 21, which allows a reduction in the wear of a lip 31 of the circulation component 13 that scoops the rollers 6.

When the retainer 21 enters the turn-around path C1 from the loaded roller rolling path A, the distal end of the band 22 of the retainer 21 may contact the outer-side wall surface 27a of the groove 27 in the turn-around path C1 in an area indicated with S1 (a finely hatched area) in FIG. 5A. Moreover, when the retainer 21 enters the loaded roller rolling path A from the turn-around path C1, the distal end of the band 22 of the retainer 21 may contact the outer-side wall surfaces 27a and 18a of the grooves 27 and 18 in the turn-around path C1 and in the loaded roller rolling path A in an area indicated with S2 (a roughly hatched area) in FIG. 5A. However, these areas S1 and S2 are relatively smaller than the turn-around path C1, and the contact between the distal end of the band 22 of the retainer 21 and the wall surfaces 27a and 18a is also weak. Hence, the contact in the areas S1 and S2 does not significantly influence the resistance during the circulation of the retainer 21.

The groove 27 in the end C11 on the return path B side of the turn-around path C1 is continuously connected to the groove 26 in the return path B. The groove 27 in the end C12 on the loaded roller rolling path A side of the turn-around path C1 is continuously connected to the groove 18 in the loaded roller rolling path A. Accordingly, the retainer 21 circulates smoothly through the joints of the return path B, the turn-around path C1, and the loaded roller rolling path A.

The roller 6 is used as the rolling element. Accordingly, it is possible to maintain the attitude of the roller 6 in the endless circulation path. Since it is possible to maintain the attitude of the retainer 21 via the roller 6, it is possible to better prevent the retainer 21 from contacting the grooves 18, 26, and 27.

Figure 6A:
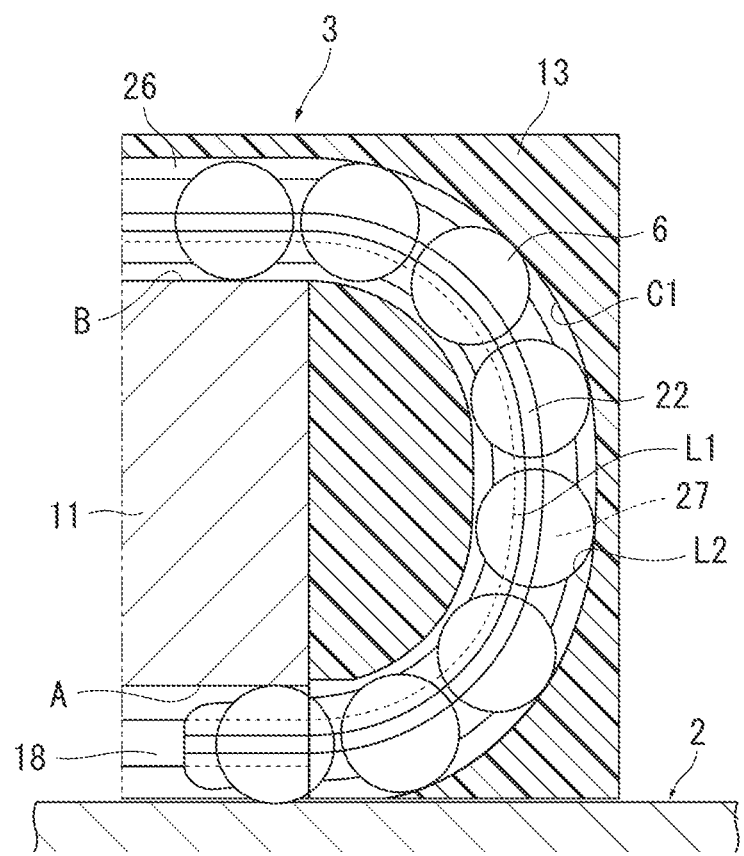
FIGS. 6A and 6B are cross-sectional views of another example of the endless circulation path (FIG. 6A is a state where the retainer and the rollers are incorporated, and FIG. 6B is a state where the retainer and the rollers have been removed).
Figure 6B:
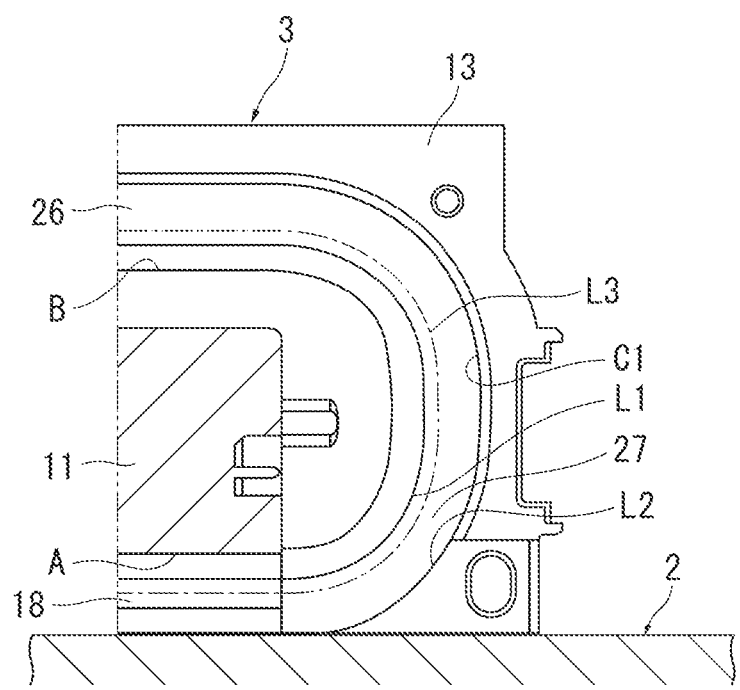

FIGS. 6A and 6B illustrate another example of the endless circulation path. In this example, the width of the groove 26 in the return path B is greater than the width of the groove 18 in the loaded roller rolling path A as in the above embodiment. The width of the groove 26 in the return path B is substantially constant along the entire length of the return path B. The width of the groove 18 in the loaded roller rolling path A is substantially constant along the entire length of the loaded roller rolling path A. The width of the groove 18 in the loaded roller rolling path A may be gradually increased toward the turn-around path C1 in an end on the turn-around path C1 side.

Unlike the above embodiment, the width of the groove 27 in the turn-around path C1 is substantially constant along the entire length of the turn-around path C1. The width of the groove 27 in the turn-around path C1 is equal to the width of the groove 26 in the return path B, and greater than the width of the groove 18 in the loaded roller rolling path A. A broken line L1 in FIG. 6A indicates the inner-side wall surface of the groove 27 in the turn-around path C1, and a solid line L2 indicates the outer-side wall surface of the groove 27 in the turn-around path C1.

According to this example, it is possible to substantially eliminate the contact between the distal end of the band 22 of the retainer 21, and the loaded roller rolling path A, the return path B, and the turn-around path C1.

Figure 7A:
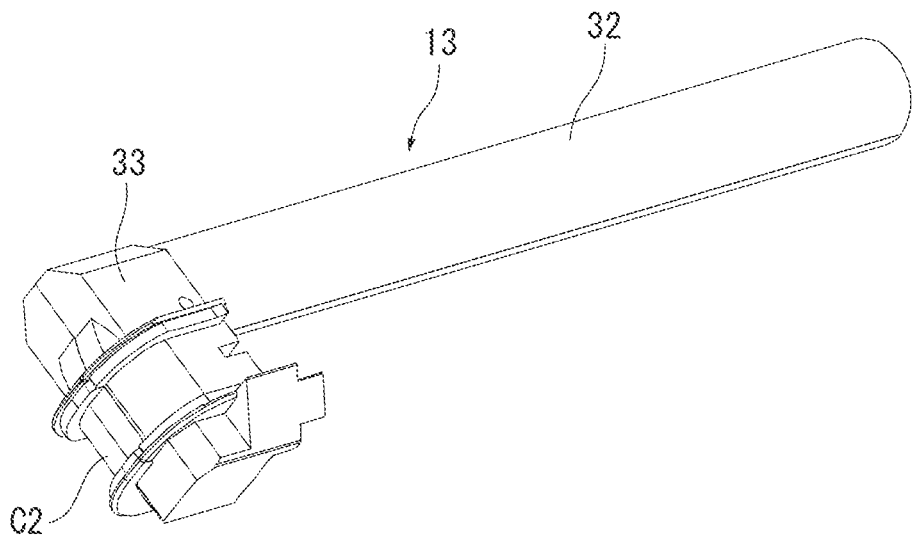
FIGS. 7A and 7B are external perspective views illustrating an example of a circulation component of the embodiment (FIG. 7A is a perspective view of the circulation component as viewed from a side of a turn-around path configuration portion, and FIG. 7B is a perspective view of the circulation component as viewed from a side of a return path configuration portion).
Figure 7B:
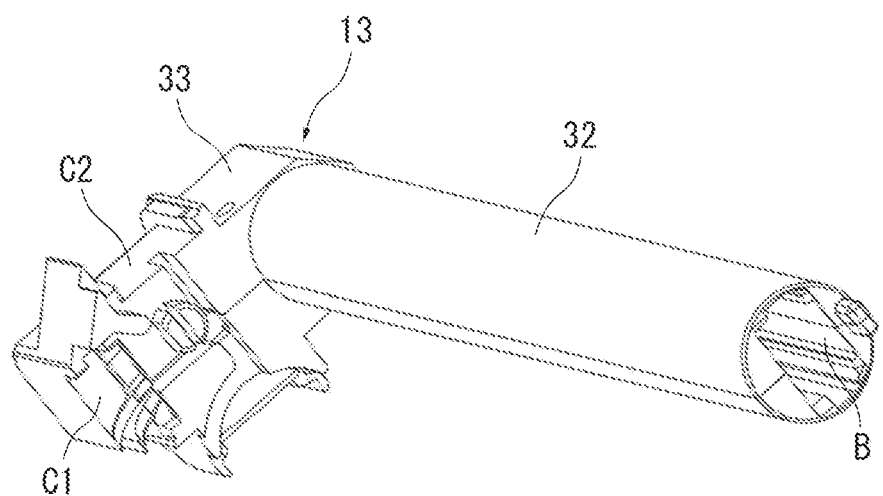

FIGS. 7A and 7B illustrate an example of the circulation component 13 that is incorporated into the movable member body 11. The circulation component 13 includes the cylindrical return path configuration portion 32 that forms the return path B, and a turn-around path configuration portion 33 provided at an end of the return path configuration portion 32. The turn-around path C1 of an inner track that passes under the other is formed in the turn-around path configuration portion 33, and an inner side of the turn-around path C2 of an outer track is formed on the turn-around path configuration portion 33.

Figure 8:
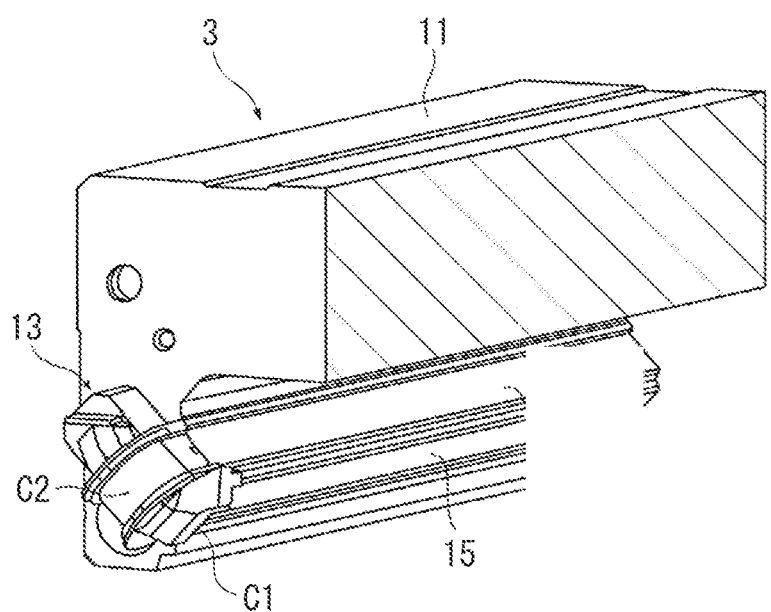
FIG. 8 is a perspective view of the circulation component in a state of being incorporated into a movable member body.

FIG. 8 illustrates a state where the circulation component 13 is incorporated into the movable member body 11. When the circulation component 13 is incorporated into the movable member body 11, the turn-around path C1 of the inner track that passes under the other is connected to the loaded roller rolling surface 15, and the inner side of the turn-around path C2 of the outer track that passes over the other is connected to the loaded roller rolling surface 14.

Figure 9:
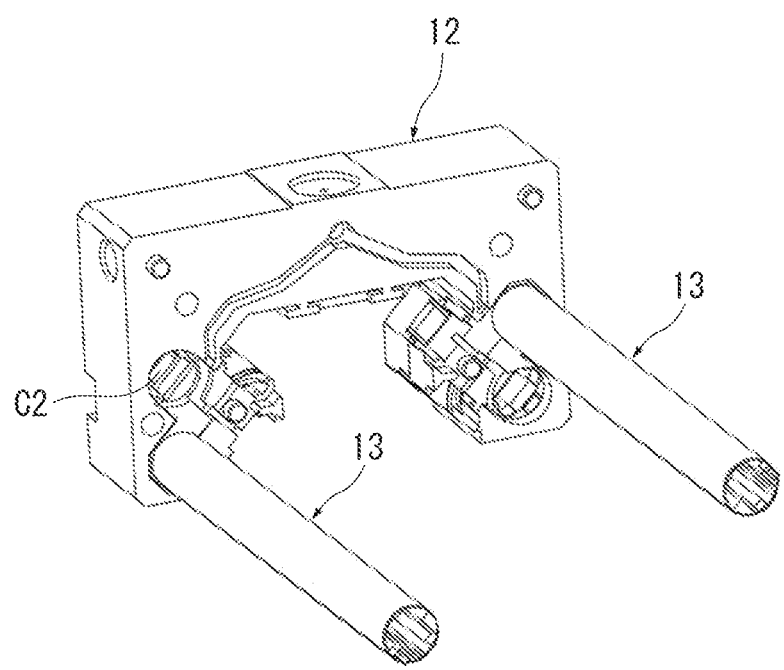
FIG. 9 is a perspective view of the circulation component in a state of being incorporated into a lid member.

FIG. 9 illustrates a state where the circulation component 13 is incorporated into the lid member 12. The inner side of the turn-around path C2 of the outer track that passes over the other is formed in the lid member 12. When the circulation component 13 is incorporated into the lid member 12, the turn-around path C2 of the outer track that passes over the other is formed. The return path B connected to the turn-around path C2 is formed in a circulation component 34 illustrated in FIGS. 10A and 10B.

Figure 10A:
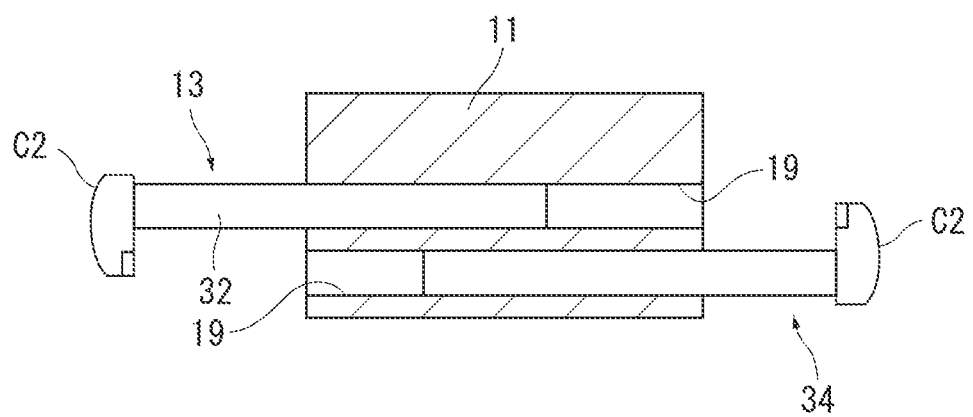
FIGS. 10A and 10B are schematic diagrams of a pair of the circulation components inserted into a pair of through-holes of the movable member body (FIG. 10A is a state during insertion, and FIG. 10B is a state after insertion).
Figure 10B:
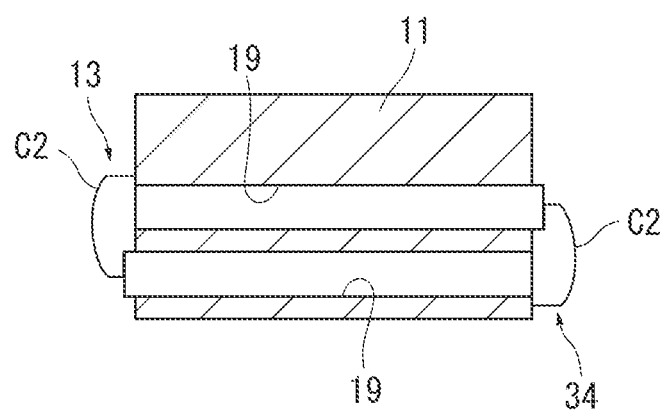

As illustrated in FIGS. 10A and 10B, the circulation component 13 and the circulation component 34 are inserted into a pair of the through-holes 19 of the movable member body 11 in directions opposite to each other. As described above, the turn-around path C1 of the inner track that passes under the other, the inner side of the turn-around path C2 of the outer track that passes over the other, and the return path B connected to the turn-around path C1 of the inner track are formed in the circulation component 13. The turn-around path C1 of the inner track that passes under the other, the inner side of the turn-around path C2 of the outer track that passes over the other, and the return path B connected to the turn-around path C2 of the outer track are formed in the circulation component 34. An outer side of the turn-around path C2 of the outer track that passes over the other is formed in the lid member 12 (refer to FIG. 9). When the circulation components 13 and 34 and the lid members 12 are incorporated into the movable member body 11, two turn-around paths C1 and C2 that pass over/under the other are formed.

The configurations of the circulation components 13 and 34 and the lid member 12, which are illustrated in FIGS. 7A to 10B, are examples. The return path configuration portions 32 and the turn-around path configuration portions 33 of the circulation components 13 and 34 may be made as separate bodies. The inner sides of the two turn-around paths C1 and C2 that pass over/under the other may be formed in the turn-around path configuration portion 33. The outer sides of the two turn-around paths C1 and C2 that pass over/under the other may be formed in the lid member 12. Moreover, the two turn-around paths C1 and C2 may not pass over/under the other.

The present invention is not limited to the realization of the above embodiment, and can be realized in other embodiments within the scope where the gist of the present invention is not changed.

For example, one retainer holds a chain of a plurality of rollers in the above embodiment. However, one retainer may hold one roller, or one retainer may hold more than two rollers, for example, two or three rollers.

In the above embodiment, the case of using the rollers as the rolling elements is described. However, balls may be used as the rolling elements.

The description is based on Japanese Patent Application No. 2019-073276 filed on Apr. 8, 2019, the entire contents of which are incorporated herein.

REFERENCE SIGNS LIST

1 Motion guide apparatus
2 Rail (track member)
3 Movable member
4, 5 Roller rolling surface (rolling element rolling portion)
6 Roller (rolling element)
14, 15 Loaded roller rolling surface (loaded rolling element rolling portion)
21 Retainer
22 Band of the retainer (end of the retainer in width direction)
18 Groove in the loaded path
26 Groove in the return path
27 Groove in the turn-around path
A Loaded roller rolling path (loaded path)
B Return path
C1, C2 Turn-around path
W1 Width of the groove in the return path, width of the groove in the end on the return path side of the turn-around path
W4 With of the groove in the loaded path, width of the groove in the end on the loaded path side of the turn-around path

The invention claimed is:

1. A motion guide apparatus comprising:
a track member including a rolling element rolling portion;
a movable member including a loaded rolling element rolling portion facing the rolling element rolling portion of the track member, a return path parallel to a loaded path formed by the rolling element rolling portion and the loaded rolling element rolling portion, and a turn-around path connected to the loaded path and the return path;
a plurality of rolling elements placed in the loaded path, the return path, and the turn-around path; and
a retainer configured to hold at least one of the plurality of rolling elements, wherein
a groove into which an end of the retainer in a width direction thereof enters is formed in the loaded path, the return path, and the turn-around path, and
a width of the groove in at least a part of the turn-around path and the width of the groove in an entire length of the return path are greater than the width of the groove in at least a part of the loaded path.

2. The motion guide apparatus according to claim 1, wherein the width of the groove in an end on the return path side of the turn-around path is greater than the width of the groove in an end on the loaded path side of the turn-around path.

3. The motion guide apparatus according to claim 2, wherein the rolling element is a roller.

4. The motion guide apparatus according to claim 2, wherein
the groove in the end on the return path side of the turn-around path is continuously connected to the groove in the return path, and
the groove in the end on the loaded path side of the turn-around path is continuously connected to the groove in the loaded path.

5. The motion guide apparatus according to claim 4, wherein the rolling element is a roller.

6. The motion guide apparatus according to claim 1, wherein the rolling element is a roller.

* * * * *